(12) United States Patent
Tomotaki et al.

(10) Patent No.: US 6,372,825 B1
(45) Date of Patent: Apr. 16, 2002

(54) AQUEOUS SOLUTION OF WATER-SOLUBLE EPOXY RESIN, SOLID OBTAINED THEREFROM, AND PROCESSES FOR PRODUCING THESE

(75) Inventors: Yoshihisa Tomotaki; Takashi Kitajima; Keiichiro Ishikawa; Akihiro Nabeshima; Tomohiro Furuichi, all of Tokushima (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/530,600

(22) PCT Filed: Sep. 21, 1999

(86) PCT No.: PCT/JP99/05128

§ 371 Date: May 9, 2000

§ 102(e) Date: May 9, 2000

(87) PCT Pub. No.: WO00/17252

PCT Pub. Date: Mar. 30, 2000

(30) Foreign Application Priority Data

Sep. 22, 1998 (JP) .......................................... 10-285932
Aug. 4, 1999 (JP) .......................................... 11-220856

(51) Int. Cl.[7] .......................... C08K 3/20; C08L 63/02
(52) U.S. Cl. ..................... 523/414; 528/94; 528/116; 528/117; 528/118
(58) Field of Search ...................... 523/414; 528/94, 528/116, 117, 118

(56) References Cited

U.S. PATENT DOCUMENTS 5,688,905 A    11/1997  Walker

FOREIGN PATENT DOCUMENTS

EP    0 894 788 A1    2/1999
EP    0 994 142 A1    4/2000

*Primary Examiner*—Robert Dawson
*Assistant Examiner*—D. Aylward
(74) *Attorney, Agent, or Firm*—Arent Fox Kintner Plotkin & Kahn PLLC

(57) ABSTRACT

The present invention provides an aqueous solution of an epoxy resin and a solid thereof, which is obtained by the following manner that an epoxy compound or a solution of the epoxy compound in organic solvent, and an amine compound of the formula (1), an aqueous solution thereof, a solution of the amine compound in organic solvent, or a solution thereof in a mixture of water and organic solvent, are mixed together so that the epoxy compound and the amine compound are reacted or polymerized to obtain a solution of an epoxy resin, to which water is added and heated to remove the organic solvent and unreacted amine compound, and a process for preparing the same $$NH_2N(R^1)(R^2) \qquad (1)$$

wherein $R^1$ and $R^2$ are the same or different and each is alkyl having 1 to 6 carbon atoms, alkylene having 2 to 11 carbon atoms or a group represented by $—R^3—N(R^4)—R^5—$ which are formed when both are bonded, $R^3$ and $R^5$ are the same or different and each is alkylene having 1 to 6 carbon atoms, and $R^4$ is alkyl having 1 to 6 carbon atoms or amino group.

7 Claims, No Drawings

AQUEOUS SOLUTION OF WATER-SOLUBLE EPOXY RESIN, SOLID OBTAINED THEREFROM, AND PROCESSES FOR PRODUCING THESE

TECHNICAL FIELD

The present invention relates to an aqueous solution of a water-soluble epoxy resin, and a solid thereof, as well as a process for preparing the same.

Epoxy resin was conventionally thought to be insoluble in water. In this sense, an aqueous solution of an epoxy resin of the present invention is entirely novel which reverses the common knowledge in the art.

Epoxy resin is widely used as a sealing material, coating composition, adhesive, etc, in a variety of fields such as electricity, electronics, and civil engineering and construction, because a cured product of epoxy resin has excellent electrical insulating properties, moisture proof, heat resistance, soldering resistance, chemical resistance, durability, adhesive property, and mechanical strength.

BACKGROUND ART

Conventionally, the curing of epoxy resin was carried out by adding a curing agent to epoxy resin, followed by heating. Examples of typical curing agents are diethylenetriamine, triethylenetetramine, isophoronediamine, diaminodiphenylmethane, diaminodiphenylsulfone, polyamides, dicyandiamide, hexahydrophthalic anhydride, methyltetrahydrophthalic anhydride, methyl nadic anhydride, novolac type phenol resin, tertiary amines, imidazoles, and amine complex of boron trifluoride.

Epoxy resin cured by such a curing agent can be dissolved in an organic solvent, however, no such epoxy resin which can be dissolved in water has been heretofore known.

An object of the present invention is to provide a novel aqueous solution of a water-soluble epoxy resin or a solid thereof which can be dissolved in water, as well as a process for preparing the same.

DISCLOSURE OF THE INVENTION

The present invention provides an aqueous solution of an epoxy resin, which is obtained by the following manner that an epoxy compound or a solution of the epoxy compound in organic solvent, and an amine compound of the formula (1), an aqueous solution thereof, a solution of the amine compound in organic solvent, or a solution thereof in a mixture of water and organic solvent, are mixed together so that the epoxy compound and the amine compound are reacted or polymerized to obtain a solution of an epoxy resin, to which water is added and heated to remove the organic solvent and unreacted amine compound $$NH_2N\ (R^1)\ (R^2) \quad (1)$$

wherein $R^1$ and $R^2$ are the same or different and each is alkyl having 1 to 6 carbon atoms, alkylene having 2 to 11 carbon atoms or a group represented by —$R^3$—N($R^4$)—$R^5$— which are formed when both are bonded, $R^3$ and $R^5$ are the same or different and each is alkylene having 1 to 6 carbon atoms, and $R^4$ is alkyl having 1 to 6 carbon atoms or amino group. The invention also provides a solid thereof and a process for preparing the same.

An aqueous solution of an epoxy resin of the invention can be prepared, for example, by the following manner that an epoxy compound or a solution thereof in organic solvent, and an amine compound of the formula (1), an aqueous solution thereof, a solution thereof in organic solvent, or a solution thereof in a mixture of water and organic solvent, are mixed together so that the epoxy compound and the amine compound are reacted or polymerized to obtain a solution of an epoxy resin, to which water is added and heated to distill away the organic solvent, water and unreacted amine compound.

Epoxy compound suitably used in the invention is not specifically limited, and it may be hitherto known one. Examples thereof are glycidyl ether type epoxy resin, glycidyl ester type resin and glycidylamine type epoxy resin.

Examples of glycidyl ether type epoxy resin are bisphenol A type, bisphenol F type, brominated bisphenol A type, hydrogenated bisphenol A type, bisphenol S type, bisphenol AF type, biphenyl type, naphthalene type, fluorene type, phenol novolac type, cresol novolac type, DPP novolac type, trifunctional type, tris(hydroxyphenyl)methane type, and tetraphenylolethane type epoxy resins.

Examples of glycidyl ester type resin are phthalate type and hexahydrophthalate type resins.

Examples of glycidylamine type epoxy resin are tetraglycidyldiaminodiphenylmethane, triglycidyl isocyanurate, hydantoin type, 1,3-bis(N,N-diglycidylaminomethyl)cyclohexane, aminophenol type, aniline type, and toluidine type epoxy resins.

As an alkyl having 1 to 6 carbon atoms which is represented by $R^1$ or $R^2$ of an amine compound of the formula (1) in the invention, there are methyl, ethyl, n-propyl, isopropyl, isobutyl, n-butyl, t-butyl, s-butyl, n-pentyl, isopentyl, t-pentyl, neopentyl, n-hexyl and isohexyl.

As an alkylene having 2 to 11 carbon atoms formed when $R^1$ and $R^2$ are bonded, there are ethylene, trimethylene, tetramethylene, pentamethylene, hexamethylene, heptamethylene, octamethylene, nonamethylene, decamethylene and undecamethylene.

As a group represented by —$R^3$—N($R^4$)—$R^5$— formed when $R^1$ and $R^2$ are bonded, there are

—(CH$_2$)$_2$—N (CH$_3$)—(CH$_2$)$^2$—

—(CH$_2$)$_2$—N (NH$_2$)—(CH$_2$)$^2$—

Examples of alkylene having 1 to 6 carbon atoms represented by $R^3$ or $R^5$, and examples of alkyl having 1 to 6 carbon atoms represented by $R^4$, are the same groups as described above.

In the present invention, the above-mentioned NH$_2$NR$^1$R$^2$ type amine compound is suitable to the object of the invention. With amine compounds other than this type of amine compound, it is impossible to obtain a water-soluble epoxy resin.

The above-mentioned amine compound is known, and there are, for example, 1-aminopyrrolidine (NR-1), 1-aminohomopiperidine (AHP), 1,1-dimethylhydrazine (UDMH), and N-amino-N'-methylpiperazine (AMPI).

In preparing the above-mentioned epoxy resin of the invention, an epoxy compound and an amine compound are usually employed in epoxy to amine equivalent ratio of 0.5 to 2.0, preferably about 1 to 1.8.

An aqueous solution of an epoxy resin of the invention can be prepared, for example, by the following manner that an epoxy compound or a solution thereof in organic solvent, and an amine compound of the formula (1), an aqueous solution thereof, a solution thereof in organic solvent, or a solution thereof in a mixture of water and organic solvent, are mixed together so that the epoxy compound and amine compound are reacted or polymerized to obtain a solution of an epoxy resin, to which water is added and heated to distill away the organic solvent and unreacted amine compound.

Examples of organic solvent for dissolving an epoxy compound are solvents which can dissolve epoxy compounds other than ketone, aldehyde, ester and halogen type solvents. Examples thereof are aromatic hydrocarbons such as toluene and xylene, and tetrahydrofuran. Especially, it is preferable to use a mixed solvent of an alcohol and one or more kinds of these solvents. Examples of alcohols are methanol, ethanol and isopropyl alcohol. The alcohol contents of a mixed solvent is about 10 to 95% by volume, preferably about 50 to 90% by volume.

The epoxy compound concentration in an organic solvent can be suitably determined depending on the kind of the solvent, the kind of the epoxy compound, and the concentration of an amine compound to be reacted. It is usually 5 to 100% by weight, preferably about 30 to 80% by weight, in terms of solids content. Too high or too low concentration is undesirable because the former would introduce an irreversible hardening reaction, failing to obtain a water-soluble epoxy resin, and the latter would lower the efficiency of preparation.

An organic solvent for dissolving an amine compound can be selected from the wide variety of compounds capable of dissolving amine compounds, except for ketone organic solvent, aldehyde organic solvent, ester organic solvent and halogen organic solvent. Preferred are alcohols such as methanol and ethanol, and tetrahydrofurans.

As an organic solvent which is used for a mixed solvent of water and an organic solvent in dissolving an amine compound, it is possible to employ the same as the organic solvent that can singly dissolve an amine compound as described above. Especially preferred are alcohols such as methanol and ethanol, because they have excellent miscibility with water.

In an aqueous solution of amine compound, a solution thereof in organic solvent, or a solution thereof in a mixture of water and organic solvent, the amine compound concentration is usually about 10 to 100% by weight, preferably 30 to 90% by weight.

As to the concentrations of an epoxy compound and an amine compound, it should be noted that when either of these has a high concentration, the concentration of the other is limited. It is preferable to set so that the amount of a desired epoxy resin in a reaction solution is 30 to 80% by weight, in terms of solids content.

The reaction or polymerization between an epoxy compound and an amine compound is usually proceeded at a temperature of 10° C. to 40° C., preferably about room temperature to 30° C. The reaction is usually completed in about 30 minutes to 10 hours, however, the reaction time exceeding one hour is desirable for the purpose of aging.

The reaction product contains an organic solvent and the unreacted amine compound. These are preferably removed by purification, because the amine compound impairs the stability with time of a water-soluble epoxy resin of the invention.

As a purification method, there is one in which evaporation is performed with addition of water, to distill off an organic solvent and the remaining amine compound. In this case, the amount of water is suitably adjusted so that the epoxy resin concentration in a solution of epoxy resin is maintained at approximately less than 60%, in terms of solids content.

A water-soluble epoxy resin of the invention can be used as an aqueous solution with a solids content of 10 to 60%.

Alternatively, the water-soluble epoxy resin can be dehydrated by drying, to obtain a solid which is then pulverized to a powder.

In the present invention, when an epoxy compound as a starting material is represented by the formula (2), a water-soluble epoxy resin to be obtained is represented by the formula (3). In these formulas, "Ep" indicates an epoxy compound residue.

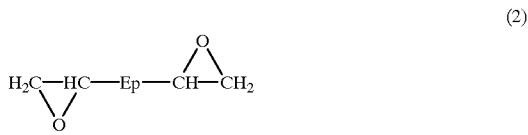

(2)

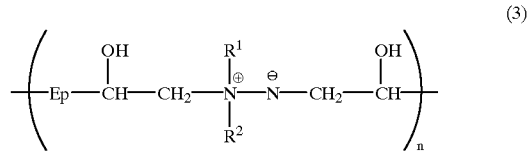

(3)

wherein $R^1$ and $R^2$ are as defined above; and n is an average repetition number in the range of $1<n<30$, preferably $2<n<20$.

To an aqueous solution of epoxy resin of the invention, curing agent and curing accelerator which have conventionally been used can be added as required, to such an extent that they do not cause adverse effects to the water-soluble epoxy resin. As a curing agent, there are, as described in the prior art, diethylenetriamine, triethylenetetramine, isophoronediamine, diaminodiphenylmethane, diaminodiphenylsulfone, polyamides, dicyandiamide, hexahydrophthalic anhydride, methyltetrahydrophthalic anhydride, methyl nadic anhydride, novolac type phenol resin, tertiary amines, imidazoles, amine complex of boron trifluoride, and melamine, methylol melamine and resol type compounds.

As a curing accelerator, there are tertiary amines such as tri-n-butylamine, benzylmethylamine, 2,4,6-tris (dimethylaminomethyl)phenol; and imidazoles such as 2-methylimidazole, 2-ethylimidazole, 2-ethyl-4-methylimidazole and 2-phenylimidazole.

To a solution of epoxy resin of the invention, any inorganic filler and reinforcing agent can be added, as required, which have conventionally been added to epoxy resin. As an inorganic filler, any known ones are usable, and there are, for example, silica, fused quartz, calcium carbonate, barium carbonate, barium sulfate, alumina hydrate, alumina, magnesia hydrate, zircon, cordierite, silicon nitride, boron nitride, and aluminum nitride. As a reinforcing agent, any known ones are usable, and there are, for example, inorganic materials such as glass chop, asbestos, talc and mica; and inorganic fibers such as glass fiber, potassium titanate fiber, titanium dioxide fiber, wollastonite, xonotlite, and zinc silicate fiber. It is known that the thermal conductivity, cracking resistance, electrical property and tracking resistance of a cured product obtained are adjustable by suitably changing the kind, purity, and amount of a filler and reinforcing agent. Usually, it is suitable to add about 20 to 160 parts by weight, preferably about 50 to 120 parts by weight, of a filler and reinforcing agent, based on 100 parts by weight of epoxy resin. Filler and reinforcing agent may be used singly or in a combination of at least two of them.

Further, to epoxy resin to which a curing agent for epoxy resin of the invention is applied, any additive that has conventionally been usually used as an additive of epoxy resin, may be added as required. Examples of such additives are inorganic pigment (particulate titanium dioxide, carbon black, red iron oxide, yellow iron oxide, etc.), organic pigment, viscosity adjusting agent, leveling agent, antifoamer, coupling agent, plasticizer, diluent, flame retardant, and organic solvent.

A solution of epoxy resin of the invention is applicable to articles of various shape which comprises at least one selected from a variety of materials such as metal, synthetic resin, cement, ceramics, fibers and papers. specifically, an article of various shape may be dipped in the epoxy resin composition of the invention, alternatively, the epoxy resin composition of the invention is applied or coated to the article surface, and then allowed to stand as it is, for curing. When heating this, the conditions of temperature and the like may be suitably selected depending on the various conditions such as the kind of epoxy resin and the kind of the curing agent. Furthermore, if other additive is added, such selection depends on the kind and amount of the additive, and the use of a cured product of epoxy resin to be obtained. Usually, it is preferable to set to about 20 to 250° C.

Also, the epoxy resin composition of the invention can be formed into a shaped product of a desired shape, in accordance with the usual molding method, e.g., casting molding, and the shaped product can be attached to an article of various shape which comprises at least one of various materials, in accordance with the usual method, e.g., bonding and fitting. The curing conditions at the molding may be almost the same as in the case with application or dipping.

BEST MODE OF CARRYING OUT THE INVENTION

The present invention will be described in more detail by the following examples.

EXAMPLE 1

A 38 g of bisphenol A type epoxy resin (trade name: Epikote 828, epoxy equivalent: 190, manufactured by Yuka Shell Epoxy Co., Ltd.) was dissolved in a mixed solvent of 20 ml of methanol and 5 ml of tetrahydrofuran. To this, 14.3 g of 60% aqueous solution of 1-aminopyrrolidine (NR-1) was added and reacted. At the time of addition, the temperature in the reaction system was maintained at 20 to 30° C., and the reaction was continued for one hour while the temperature in the reaction system was maintained at 20 to 30° C., thereby obtaining a water-soluble epoxy resin of the invention. Then, while adding water to the water-soluble epoxy resin, the unreacted amine compound and organic solvent were distilled away by using an evaporator, resulting in an aqueous solution (solids content: 40%) of water-soluble epoxy resin which is viscous and pale yellow.

By using a MALDI-TOF/MS (matrix-assisted laser desorption ionization-time of flight mass analyzer), the molecular weight of the obtained epoxy resin was measured (measuring apparatus model: TOF/MS MALDI-IV, manufactured by Shimadzu Corporation). There was formed a resin having a molecular weight distribution of 3,000 to 3,400, and having 6 to 7 units.

This resin was coated in a thin film on a glass plate by using a doctor blade, and was allowed to stand at room temperature for 12 hours. As a result, it was solidified to form an epoxy resin coating.

EXAMPLE 2

A 30.6 g of phenol novolac type epoxy resin (trade name: Epikote 152, epoxy equivalent: 175, manufactured by Yuka Shell Epoxy Co., Ltd.) was dissolved in a mixed solvent of 20 ml of methanol and 10 ml of tetrahydrofuran. To this, 4.3 g of 60% aqueous solution of 1-aminopyrrolidine was added and reacted. At the time of addition, the temperature in the reaction system was maintained at 20 to 30° C., and the reaction was continued for one hour while the temperature in the reaction system was maintained at 20 to 30° C., thereby obtaining a water-soluble epoxy resin of the invention. The unreacted amine compound and organic solvent were distilled away by using an evaporator while adding water to the water-soluble epoxy resin, resulting in an aqueous solution (solids content: 40%) of water-soluble epoxy resin which is viscous and pale yellow.

This resin was coated in a thin film on a glass plate by using a doctor blade, and was allowed to stand at room temperature for 12 hours. As a result, it was solidified to form an epoxy resin coating.

EXAMPLE 3

A water-soluble epoxy resin was obtained in the same manner as in Example 1, except that 1-aminohomopiperidine (AHP), 1,1-dimethylhydrazine (UDMH) and N-amino-N'-methylpiperazine (AMPI) were used in place of 1-aminopyrrolidine (NR-1). This was subjected to vacuum drying in a desiccator, and the residue was pulverized to a powder. The powder was added to water to visually observe whether it had water solubility, and its water solubility was confirmed.

Separately, the obtained aqueous solution was coated in a thin film on a glass plate by using a doctor blade, and was allowed to stand at room temperature for 12 hours. As a result, it was solidified to form an epoxy resin coating.

REFERENCE EXAMPLE 1

The structure of solids of water-soluble epoxy resin of the invention was investigated by using the following models. Firstly, 2.98 g of 1,1-dimethylhydrazine was dissolved in a mixture of 4.37 g of methanol and 0.90 g of $H_2O$. To this, 25.04 g of 60% solution of phenyl glycidyl ether in methanol was added dropwise over one hour at 10° C. After the addition, the temperature of the mixture was raised to room temperature (29° C.), and stirred for two days. From the results of HPLC analysis, it was found that the conversion of 1,1-dimethylhydrazine was 99% or more. In the analysis, two components were detected as main components. Specifically, a first component was formed at a rate of 40%, and a second component was formed at a rate of 50%, in the percentage of area.

Phenylglycidyl ether and 1,1-dimethylhydrazine as a starting material were represented by the formula (4) and formula (5), respectively. "Ph" is phenyl group and "Me" methyl group.

(4)

(5)

Firstly, 5 g of the reaction product was weighed out, and it was subjected to concentration and column chromatography (silica gel: solvent=methanol, H₂O), thereby to remove other compositions. A desired object adsorbed to silica gel was extracted with a 1000-ml hot water, followed by concentration. This was further extracted five times with a 200-ml hot ethanol, followed by concentration, so that the first component of the formula (6) was isolated as a pale yellow viscous liquid.

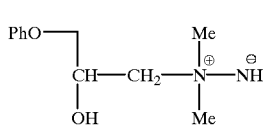
(6)

¹H-NMR(D₂O): δ 3.20 ppm (NH, 1H), 3.28, 3.32 ppm (N—Me, 6H), 3.64 ppm (CH₂, 2H), 3.96 ppm (CH₂, 2H), 4.55 ppm (CH, 1H), 6.8~7.0 ppm (ArH, 3H), 7.1~7.3 ppm (ArH, 2H) IR(NaCl): 3250 cm⁻¹ (OH or NH), 1600 cm⁻¹ (C=C), 1050 cm⁻¹ (COC) MS(FD): 211 (M⁺+1)

Firstly, 5 g of the reaction product was weighed out, and it was purified by means of concentration and column chromatography (silica gel: solvent=methanol/CH₂Cl₂=1/1, CH₂Cl₂), so that the second component of the formula (7) was isolated as a colorless viscous liquid.

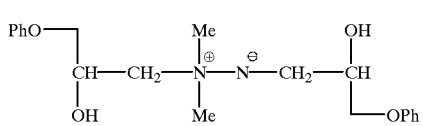
(7)

¹H-NMR (CDCl₃): Δ 2.6 ppm (OH, 2H), 3.41 ppm (N—Me, 6H), 3.6 ppm (CH², 4H), 4.0 ppm (CH², 4H), 4.05~4.15 ppm (CH, 2H), 6.9~7.0 ppm (ArH, 6H), 7.1~7.2 ppm (ArH, 4H) IR(NaCl): 3430 cm⁻¹ (OH or NH), 1600 cm⁻¹ (C=C), 1120, 1050 cm⁻¹ (COC)

EXAMPLE 4

A 3.09 g of 1,1-dimethylhydrazine was dissolved in a mixture of 11.41 g of methanol and 0.93 g of H₂O. To this, 22.37 g of 87% solution of bisphenol A type epoxy resin (trade name: Epikote 828, manufactured by Yuka Shell Epoxy Co., Ltd.) in tetrahydrofuran was added dropwise over one hour at 10° C. After the addition, the temperature of the mixture was raised to room temperature (29° C.), and stirred for two days. From the results of HPLC analysis, it was found that the conversion of 1,1-dimethylhydrazine was 99% or more. Thereafter, the resulting mixture was concentrated and dried to obtain a white solid. Its structure was confirmed by ¹H-NMR measurement. ¹H-NMR (D₂O)

There was detected N—CH₃ proton signal (δ3.1 to 3.3 ppm) having a considerable down shift in magnetic field due to the amine and imine structure.

Bisphenol A type epoxy resin as a starting material is represented by the formula (8), and an epoxy resin as a product is represented by the formula (9)

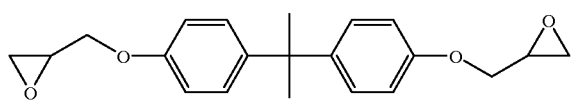
(8)

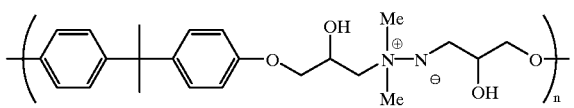
(9)

wherein n is 1 to 30.

INDUSTRIAL APPLICABILITY

According to the present invention, it is possible to provide a novel aqueous solution of a water-soluble epoxy resin, and a solid thereof, which are soluble in water, as well as a process for preparing the same.

What is claimed is:

1. An aqueous solution of an epoxy resin, which is obtained by the following manner that an epoxy compound or a solution of the epoxy compound in organic solvent, and an amine compound of the formula (1), an aqueous solution thereof, a solution of the amine compound in organic solvent, or a solution thereof in a mixture of water and organic solvent, are mixed together so that the epoxy compound and the amine compound are reacted or polymerized to obtain a solution of an epoxy resin, to which water is added and heated to remove the organic solvent and unreacted amine compound $$NH_2N(R^1)(R^2) \quad (I)$$

wherein R¹ and R² are the same or different and each is alkyl having 1 to 6 carbon atoms;

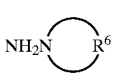
(II)

wherein R⁶ is an alkylene having 2 to 11 carbon atoms;

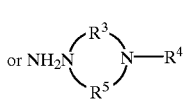
(III)

wherein R³ and R⁵ are the same or different and each is alkylene having 1 to 6 carbon atoms, and R⁴ is alkyl having 1 to 6 carbon atoms or amino group.

2. An aqueous solution as defined in claim 1 wherein the epoxy compound is bisphenol A type epoxy resin.

3. An aqueous solution as defined in claim 2 wherein the amine compound is 1-aminopyrrolidine.

4. An aqueous solution as defined in claim 2 wherein the ratio of the epoxy compound and an amine compound (equivalent ratio of epoxy to amine) is 0.5 to 2.0.

5. A process for preparing an aqueous solution of an epoxy resin, by the following manner that an epoxy compound or a solution thereof in organic solvent, and an amine compound of the formula I, II or III, an aqueous solution thereof, a solution thereof in organic solvent, are mixed together so that the epoxy compound and the amine compound are reacted or polymerized to obtain a solution of an epoxy resin, to which water is added and heated to distill off the organic solvent and unreacted amine compound to obtain an aqueous solution of an epoxy resin.

6. A solid of a water-soluble epoxy resin which is obtained by drying the aqueous solution of a water-soluble epoxy resin of claim 1.

7. A powder of the solid of a water-soluble epoxy resin which is obtained by pulverizing the solid of a water-soluble epoxy resin of claim 6.

* * * * *